(12) United States Patent
Patty

(10) Patent No.: US 6,646,660 B1
(45) Date of Patent: Nov. 11, 2003

(54) METHOD AND APPARATUS FOR PRESENTING PROCESS CONTROL PERFORMANCE DATA

(75) Inventor: Richard B. Patty, Buda, TX (US)

(73) Assignee: Advanced Micro Devices Inc., Austin, TX (US)

(*) Notice: Subject to any disclaimer, the term of this patent is extended or adjusted under 35 U.S.C. 154(b) by 497 days.

(21) Appl. No.: 09/675,993

(22) Filed: Sep. 29, 2000

(51) Int. Cl.[7] .................................................. G09G 5/00
(52) U.S. Cl. ........................ 345/965; 700/17; 700/83; 700/121; 700/108; 700/174; 700/116; 700/180
(58) Field of Search ................................... 345/700, 764, 345/964, 961, 965; 700/17, 91, 83, 108, 174, 121, 111, 116, 180

(56) References Cited

U.S. PATENT DOCUMENTS

| | | | |
|---|---|---|---|
| 5,903,462 A | * 5/1999 | Wagner et al. ............. 700/168 |
| 6,049,775 A | * 4/2000 | Gertner et al. ............. 705/8 |
| 6,148,239 A | * 11/2000 | Funk et al. ............. 700/1 |
| 6,363,294 B1 | * 3/2002 | Coronel et al. ............. 700/121 |

* cited by examiner

Primary Examiner—Kristine Kincaid
Assistant Examiner—Nhon D Nguyen
(74) Attorney, Agent, or Firm—Williams, Morgan & Amerson, P.C.

(57) ABSTRACT

A method for presenting performance data from a process flow includes providing a tool link associated with a first subset of the performance data for at least one tool in the process flow; providing a recipe link associated with a second subset of the performance data for at least one recipe in the process flow; displaying the first subset of the performance data in response to the tool link being selected; and displaying the second subset of the performance data in response to the recipe link being selected.

19 Claims, 3 Drawing Sheets

| Summary | Tool 1 | Tool 2 | Tool 3 | Tool 4 | Tool 5 |
|---|---|---|---|---|---|
| Recipe 1 | Parameter | Parameter | Parameter | Parameter | Parameter |
| Recipe 2 | Parameter | Parameter | Parameter | Parameter | Parameter |
| Recipe 3 | Parameter | Parameter | Parameter | Parameter | Parameter |
| Recipe 4 | Parameter | Parameter | Parameter | Parameter | Parameter |
| Recipe 5 | Parameter | Parameter | Parameter | Parameter | Parameter |
| Recipe 6 | Parameter | Parameter | Parameter | Parameter | Parameter |

Figure 3

METHOD AND APPARATUS FOR PRESENTING PROCESS CONTROL PERFORMANCE DATA

BACKGROUND OF THE INVENTION

1. Field of the Invention

This invention relates generally to process control, and, more particularly, to a method and apparatus for presenting process control performance data.

2. Description of the Related Art

Statistical process control techniques are commonly used to monitor the operation of manufacturing processes, systems, or individual manufacturing tools. Commonly, various measurements related to the process being monitored are compiled and plotted on a control chart. The control chart has control limits, which, if violated, immediately indicate an error condition requiring investigation. Certain error conditions result from special causes, such as a defective tool, operator error, material defect, process changes, trends, etc., that may be corrected by process optimization or redesign.

Generally, the data gathered is evaluated against various rules to determine if an error condition has occurred. Although, various rules may be used, many companies have adopted the "Western Electric Rules," originally developed by the Western Electric Company. The rules specify that an error occurs if:

Rule 1: One measurement exceeds three standard deviations from the target (i.e., $1 > 3\sigma$);

Rule 2: Two out of three consecutive measurements exceed two standard deviations from the target on one side of the target (i.e., $\frac{2}{3} > \sigma$);

Rule 3: Four out of Five consecutive measurements exceed one standard deviation from the target on one side of the target (i.e., $\frac{4}{5} > \sigma$); and Rule 4: Eight consecutive points on one side of the target.

Referring to FIG. 1, a graph of a typical control chart 10 is provided. The control chart may represent any number of measurements pertaining to a particular line, process, or tool, for example. On the x-axis 12, the measurement dates are recorded. The y-axis 14 represents the measurement values. The target for the process being measured is designated by a target line 16 (e.g., 175). Upper and lower control limits 18, 20 are also shown. In the control chart of FIG. 1, exceeding the control limits 18, 20, corresponds to a rule 1 violation, i.e., the measurement deviating from the target by more than three standard deviations. The data point 22 represents the eighth consecutive data point on the positive side of the target, resulting in a rule 4 violation.

In some applications, a particular line, process, or tool may be used with various operating parameters to accomplish different tasks. For example, a tool commonly used in the manufacture of semiconductor devices is a metal deposition tool. Semiconductor wafers are processed in the metal deposition tool using different parameters to control the formation of a metal layer. Typically, for each lot of wafers, measurements are taken of the thickness of the deposited metal to gauge the performance of the metal deposition tool. The individual lot measurements may be averaged to determine a single data point for inclusion on the control chart. Control charting is conducted on various measurable parameters. A particular metal deposition tool may use numerous recipes (i.e., sets of operating parameters), depending on the specific desired qualities of the metal layer being deposited. The particular recipe used by the metal deposition tool may be changed frequently.

Control charting the performance of the metal deposition tool using multiple recipes is burdensome, because the targets and control limits are different for each recipe. Accordingly, measurement data is independently charted for each recipe, yielding a large number of control charts. The problem with the large number of charts is exacerbated by the fact that in a manufacturing environment, such as a semiconductor fabrication facility, there are commonly multiple metal deposition tools being tracked and also multiple types of other tools being tracked. Collectively, the number of control charts that require updating and review can become resource intensive. In a typical semiconductor manufacturing facility, there can be as many as 13,000 individual control charts. This large number of control charts poses a resource problem. Due to the sheer number of control charts, many may only receive a cursory review and important information may be overlooked.

The present invention is directed to overcoming, or at least reducing the effects of, one or more of the problems set forth above.

SUMMARY OF THE INVENTION

One aspect of the present invention is seen in a method for presenting performance data from a process flow. The method includes providing a tool link associated with a first subset of the performance data for at least one tool in the process flow; providing a recipe link associated with a second subset of the performance data for at least one recipe in the process flow; displaying the first subset of the performance data in response to the tool link being selected; and displaying the second subset of the performance data in response to the recipe link being selected.

BRIEF DESCRIPTION OF THE DRAWINGS

The invention may be understood by reference to the following description taken in conjunction with the accompanying drawings, in which like reference numerals identify like elements, and in which:

FIG. 3 is a diagram of a chart display interface in accordance with the present invention.

Figure 1:
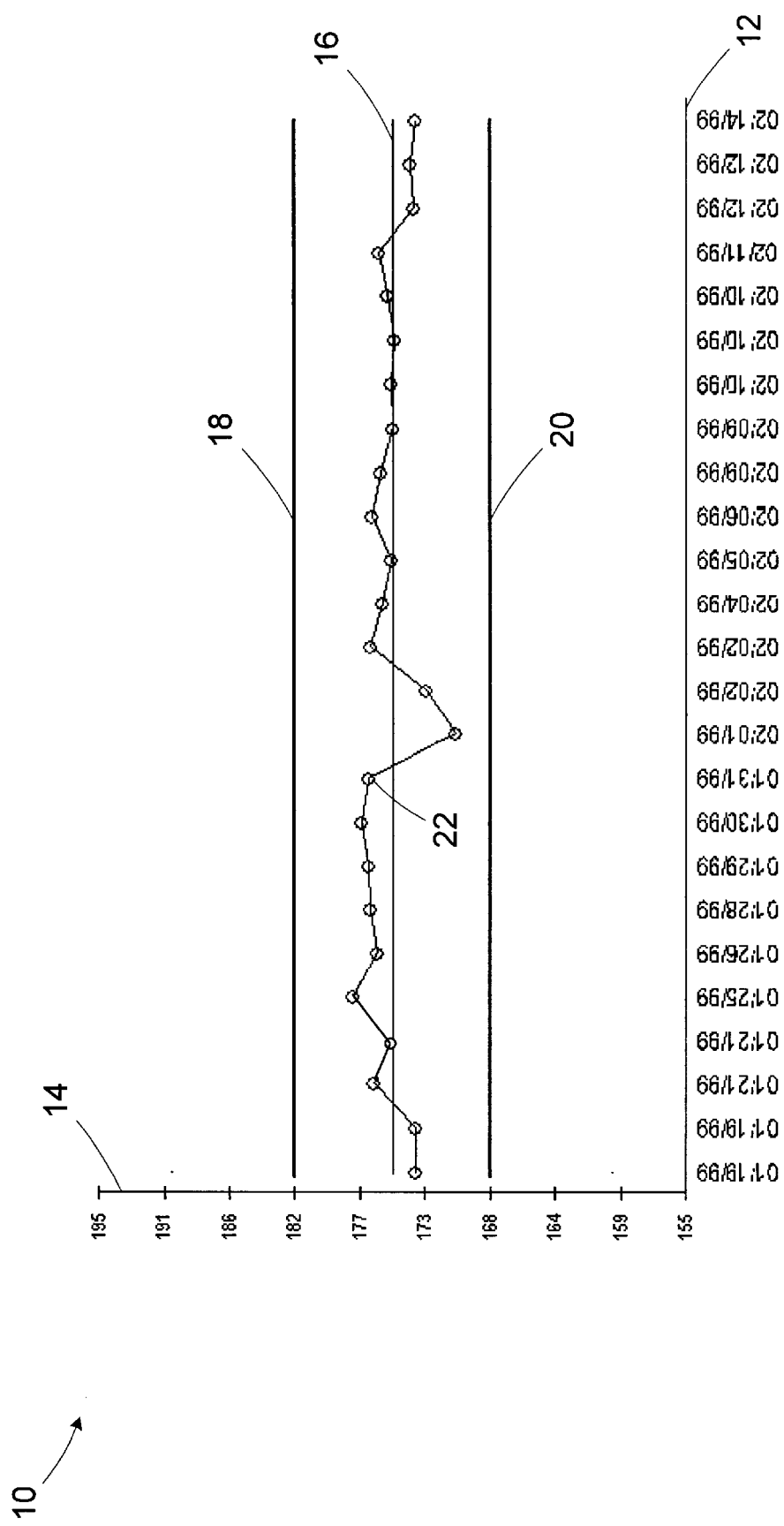
FIG. 1 is a diagram of a typical control chart used to monitor the performance of a manufacturing line, process, or tool.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
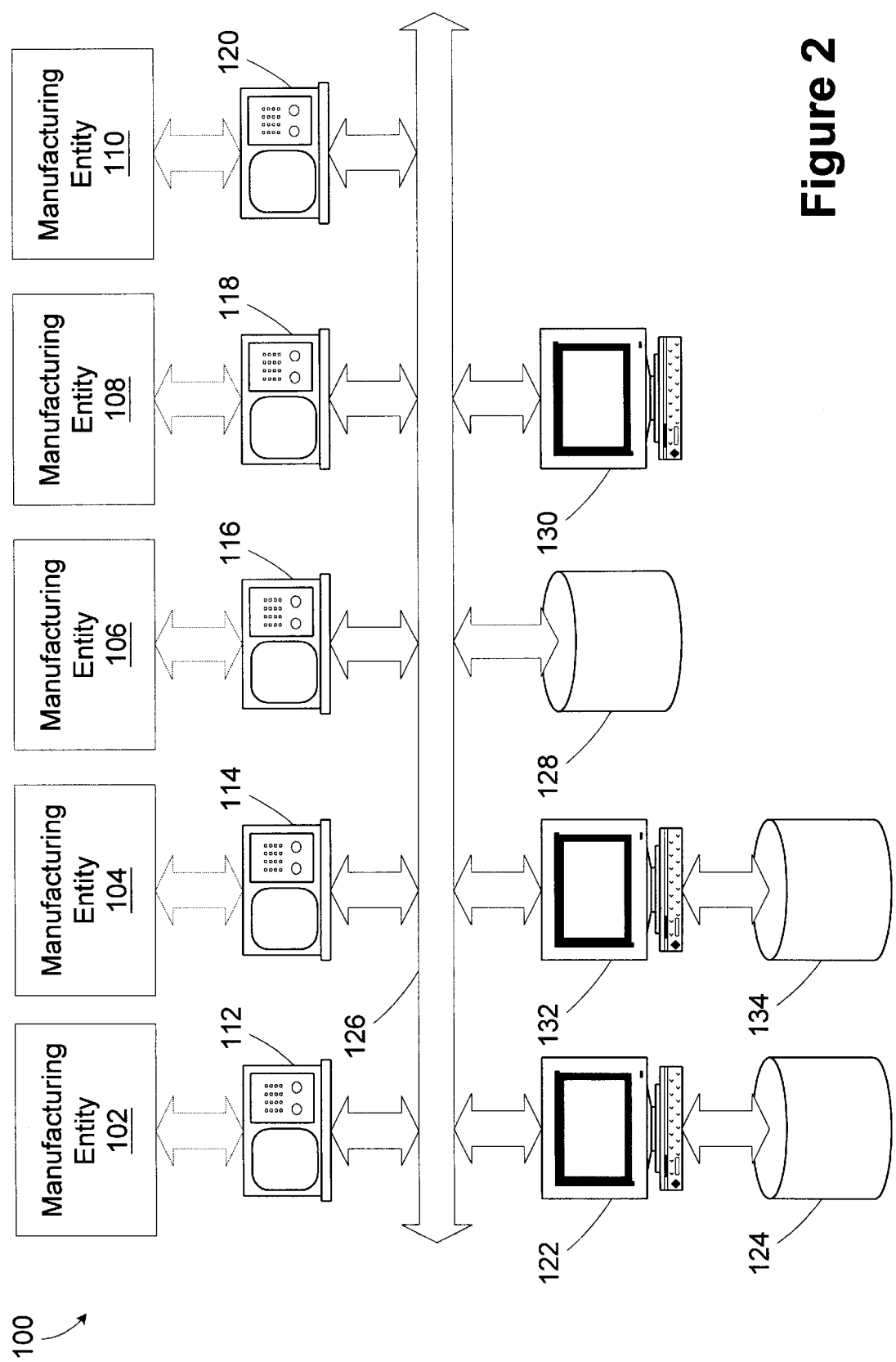
FIG. 2 is a block diagram of a manufacturing control system in accordance with the present invention.

Referring now to FIG. 2, a block diagram of a manufacturing control system 100 is provided. The manufacturing control system 100 includes manufacturing entities 102, 104, 106, 108, 110. The manufacturing entities 102, 104, 106, 108, 110 may each represent a production line, a process, a manufacturing tool, or some other entity having quantifiable output parameters suitable for control charting. In the illustrated embodiment, the manufacturing entities 102, 104, 106, 108, 110 are semiconductor processing tools, such as metal deposition tools, and the manufacturing control system 100 is used to control various components, including many other processing tool (not shown) in a semiconductor fabrication facility.

Metrology tools 112, 114, 116, 118, 120 evaluate an output parameter of their associated manufacturing entities 102, 104, 106, 108, 110 to measure a characteristic of the product. Although multiple metrology tools 112, 114, 116, 118, 120 are shown, it is contemplated that a shared metrology tool (not shown) may also be used. Although the application of the invention is not limited to a particular process or tool, for clarity and ease of illustration, the invention is described hereinafter as it may be applied to measurements (e.g., metal layer thickness) taken to monitor the performance of metal deposition tools used in the manufacture of semiconductor devices.

The manufacturing control system 100 further includes a work-in-process (WIP) server 122 (e.g., a WorkStream server offered by Consillium, Inc.) having a database 124 for controlling various operations within the manufacturing control system 100. The WIP server 122 interfaces with various tools (e.g., the manufacturing entities 102, 104, 106, 108, 110) in the manufacturing control system 100. The manufacturing control system 100 also includes a communication bus 126 for coupling the various components of the system 100. The metrology tools 112, 114, 116, 118, 120 provide metrology data over the communication bus 126 to the WIP server 122 for each lot measured, and the WIP server 122 stores the data in the database 124. In addition, the metrology tools 112, 114, 116, 118, 120 may provide at least a subset of the same data over the communication bus 126 to a file server 128 for each lot measured.

A client computer 130 coupled to the communication bus 126 executes statistical process control (SPC) software that retrieves the metrology data from the file server 128, analyzes the data as described in greater detail below, and transfers the processed SPC data to a database server 132. Hereinafter, the client computer 130 is referred to as an SPC client 130. The database server 132 also includes a database 134 for storing the processed SPC data. The database server 132 allows multiple SPC clients 130 to access the data centrally stored on the database 134. It is contemplated that the functions performed by the WIP server 122, SPC client 130, and the database server 132 may be consolidated onto fewer workstations (not shown) in a small manufacturing environment, or conversely, they may be distributed among more workstations (not shown) in a larger manufacturing environment.

The manufacturing entities 102, 104, 106, 108, 110 are capable of using different manufacturing recipes, which may be changed frequently, as needed. Metrology data gathered by the metrology tools 112, 114, 116, 118, 120 is stored on the WIP server 122 and the file server 128 for each recipe.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Turning now to FIG. 3, a diagram of a chart display interface 300 in accordance with the present invention is provided. The chart display interface 300 is implemented in software executing on the SPC client 130. The chart display interface 300 provides an access point for the multiple control charts available for controlling a family of like processing tools and their associated recipes. In the illustrated embodiment, the chart display interface 300 is depicted as a matrix, however, other representations are possible. The chart display interface 300 includes a plurality of tool links 310 and recipe links 320. The tool links 310 reference performance data related to a particular family of like tools (e.g., metal deposition tools). The recipe links 320 reference performance data for the tools that relate to particular recipes. A plurality of parameter links 330 are defined by the intersections of the tool and recipe links 310, 320. The parameter links 330 reference performance data (e.g., thickness) relating to a particular tool and recipe. A summary link 340 references performance data associated with all of the tools and all of the recipes.

The chart display interface 300 provides a graphical user interface for accessing the plethora of performance data associated with the various tools and recipes. In the illustrated embodiment, the chart display interface 300 includes five tool links 310 and six recipe links 320. Referencing the performance data separately would require 30 different charts. By selecting the various links 310, 320, 330, 340 in the chart display interface 300, a user can conveniently review the performance data at whatever level of detail is desired. In response to the summary link 340 being selected, the SPC client 130 collects (e.g., from the database server 132) and displays the performance data for all of the tools and recipes on a common chart. In response to one of the tool links 310 being selected, the SPC client 130 displays the performance data for one of the tools and all of its recipes. Likewise, in response to one of the recipe links 320 being selected, the SPC client 130 displays the performance data for all of the tools pertaining to a particular recipe. In response to one of the parameter links 330 being selected, the SPC client 130 displays the performance data for one of the tools and one of the recipes. The performance data may be shown using raw data values or, alternatively, the performance data may be normalized or represented as a percent deviation from the target value of process defined by the recipe.

The vertical and horizontal views of the performance data provided by the SPC client 130 using chart display interface 300 allows the user to readily review a large amount of performance data quickly. By first accessing the performance data using the summary link 340, the user can get an overview of the particular process. If performance data for one of the tools or recipes is not consistent with its counterparts, the user may zoom in on the problematic performance data. For example, if the users sees an apparent problem, the recipe link 320 can be used to evaluate the performance of the all of the tools for a given recipe. If the tools are consistent with each other, their respective performance data should significantly overlap. If one of the tools is operating aberrantly, it may be easily visible juxtaposed with the performance data of the other tools. Likewise, a problem with a particular recipe may be identified by selecting a tool link 310 and viewing all of the data for that tool and its various recipes. The performance data can be normalized using its target value, and, similarly, a problem the tool is having with a particular recipe may become apparent.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for presenting performance data from a process flow, comprising:
   providing a tool link associated with a first subset of the performance data for at least one tool in the process flow;
   providing a recipe link associated with a second subset of the performance data for at least one recipe in the process flow;
   displaying the first subset of the performance data in response to the tool link being selected; and
   displaying the second subset of the performance data in response to the recipe link being selected.

2. The method of claim 1, further comprising:
   providing a summary link; and
   displaying the first and second subset of the performance data in response to the summary link being selected.

3. The method of claim 1, further comprising:
   providing a parameter link, the parameter link being associated with a particular tool and a particular recipe in the process flow; and
   intersecting the first and second sets of the performance data in response to the parameter link being selected to generate a third subset of the performance data associated with the particular tool and particular recipe; and
   displaying the third set of the performance data in response to the tool link being selected.

4. The method of claim 1, further comprising normalizing at least one of the first and second subsets of the performance data based on a recipe target value.

5. The method of claim 1, wherein displaying the first subset of the performance data includes displaying the first subset of the performance data in a control chart.

6. The method of claim 1, wherein displaying the second subset of the performance data includes displaying the second subset of the performance data in a control chart.

7. The method of claim 2, wherein displaying the first and second subsets of the performance data includes displaying the first and second subsets of the performance data in a control chart.

8. The method of claim 1, further comprising:
   providing a plurality of tool links associated with performance data for a plurality of tools in the process flow; and
   providing a plurality of recipe links associated with performance data for a plurality of recipes in the process flow.

9. The method of claim 8, further comprising displaying the tool links and recipe links on a computer display in a matrix.

10. A program storage device encoded with instructions that, when executed by a computer, implement a method for presenting performance data from a process flow, the method comprising:
    displaying a tool link associated with a first subset of the performance data for at least one tool in the process flow;
    displaying a recipe link associated with a second subset of the performance data for at least one recipe in the process flow;
    displaying the first subset of the performance data in response to the tool link being selected; and
    displaying the second subset of the performance data in response to the recipe link being selected.

11. The program storage device of claim 10, wherein the method further comprises:
    providing a summary link; and
    displaying the first and second subsets of the performance data in response to the summary link being selected.

12. The program storage device of claim 10, wherein the method further comprises:
    displaying a parameter link, the parameter link being associated with a particular tool and a particular recipe in the process flow; and
    intersecting the first and second subsets of the performance data in response to the parameter link being selected to generate a third subset of the performance data associated with the particular tool and particular recipe; and
    displaying the third subset of the performance data in response to the tool link being selected.

13. The program storage device of claim 10, wherein the method further comprises normalizing at least one of the first and second subsets of the performance data based on a recipe target value.

14. The program storage device of claim 10, wherein displaying the first subset of the performance data in the method includes displaying the first subset of the performance data in a control chart.

15. The program storage device of claim 10, wherein displaying the second subset of the performance data in the method includes displaying the second subset of the performance data in a control chart.

16. The program storage device of claim 11, wherein displaying the first and second subsets of the performance data in the method includes displaying the first and second subsets of the performance data in a control chart.

17. The program storage device of claim 10, wherein the method further comprises:

displaying a plurality of tool links associated with performance data for a plurality of tools in the process flow; and displaying a plurality of recipe links associated with performance data for a plurality of recipes in the process flow.

18. The program storage device of claim 8, wherein the method further comprises displaying the tool links and recipe links on a computer display in a matrix.

19. A computer system for presenting performance data from a process flow, comprising:

means for displaying a tool link associated with a first subset of the performance data for at least one tool in the process flow;

means for displaying a recipe link associated with a second subset of the performance data for at least one recipe in the process flow;

means for displaying the first subset of the performance data in response to the tool link being selected; and means for displaying the second subset of the performance data in response to the recipe link being selected.

* * * * *